(12) United States Patent
Langille et al.

(10) Patent No.: US 8,230,659 B2
(45) Date of Patent: Jul. 31, 2012

(54) INTUMESCENT FIRE DOOR EDGE SYSTEM

(75) Inventors: Kevin B. Langille, Milton (CA); Dat T. Nguyen, Oakville (CA); Ho T. Nguyen, Toronto (CA); An Cong Bach, Mississauga (CA)

(73) Assignee: Lanotek Products Inc., Halton Hills (CA)

( * ) Notice: Subject to any disclaimer, the term of this patent is extended or adjusted under 35 U.S.C. 154(b) by 61 days.

(21) Appl. No.: 12/889,867

(22) Filed: Sep. 24, 2010

(65) Prior Publication Data
US 2011/0314755 A1 Dec. 29, 2011

Related U.S. Application Data

(60) Provisional application No. 61/358,458, filed on Jun. 25, 2010.

(51) Int. Cl.
*E04C 2/00* (2006.01)
*E06B 1/04* (2006.01)

(52) U.S. Cl. ......... 52/741.3; 52/232; 52/204.1; 52/210; 52/213

(58) Field of Classification Search .......... 52/204.1, 52/210, 213, 232
See application file for complete search history.

(56) References Cited

U.S. PATENT DOCUMENTS

| | | | | |
|---|---|---|---|---|
| 4,850,385 | A | * | 7/1989 | Harbeke .................. 137/75 |
| 4,888,925 | A | * | 12/1989 | Harbeke .................. 52/232 |
| 4,916,800 | A | * | 4/1990 | Harbeke .................. 29/469 |
| 5,105,592 | A | * | 4/1992 | MacMillan et al. ........ 52/232 |
| 5,244,709 | A | * | 9/1993 | Vanderstukken .......... 428/99 |
| 5,452,551 | A | * | 9/1995 | Charland et al. .......... 52/232 |
| 6,115,976 | A | | 9/2000 | Gomez |
| 6,643,991 | B1 | | 11/2003 | Moyes |
| 6,725,615 | B1 | * | 4/2004 | Porter .................. 52/232 |
| 6,745,526 | B1 | | 6/2004 | Autovino |
| 7,617,643 | B2 | * | 11/2009 | Pilz et al. .............. 52/232 |
| 7,669,383 | B2 | | 3/2010 | Darnell |
| 7,950,198 | B2 | * | 5/2011 | Pilz et al. .............. 52/232 |
| 8,097,310 | B2 | * | 1/2012 | Miller et al. ............ 428/34.1 |
| 2002/0124497 | A1 | | 9/2002 | Fortin et al. |
| 2003/0105188 | A1 | * | 6/2003 | Nguyen et al. .......... 523/179 |
| 2003/0192269 | A1 | * | 10/2003 | Radke et al. .......... 52/220.8 |
| 2011/0314756 | A1 | * | 12/2011 | Hilburn, Jr. ............ 52/232 |
| 2011/0314757 | A1 | * | 12/2011 | Pilz et al. ............ 52/232 |

* cited by examiner

*Primary Examiner* — Mark Wendell
(74) *Attorney, Agent, or Firm* — Bereskin & Parr LLP/S.E.N.C.R.

(57) ABSTRACT

An intumescent strip includes a first material layer and an opposing second material layer. A third material layer, formed from an intumescent material, is positioned between the first and second layers. The intumescent material includes a combination of intumescent particles suspended within a thermoplastic material. The intumescent particles have an activation temperature and are expandable when exposed to temperatures above the activation temperature. The thermoplastic material has a melting temperature that is lower than the activation temperature.

20 Claims, 8 Drawing Sheets

INTUMESCENT FIRE DOOR EDGE SYSTEM

CROSS-REFERENCE TO RELATED APPLICATION(S)

This application claims the benefit of co-pending U.S. Provisional Application No. 61/358,458, filed Jun. 25, 2010, hereby incorporated by reference.

FIELD

This patent applies to the intumescent materials and components, and fire doors.

INTRODUCTION

Fire barriers are a passive means of fire protection. These include fire rated floors, walls, penetration barriers, and fire doors. The purpose of a fire barrier is to contain a fire within one compartment or room for a period of time.

The testing method for fire doors in the United States has changed over the past 13 years from negative pressure to positive pressure. Under the UBC 7-2 1997 code requirements, swinging door assemblies are now required to be classified as tested under a positive pressure (UL10-C positive pressure fire test). The UL10-C positive pressure test more closely represents an actual fire in which a compartment containing a fire would be at a slightly elevated (positive) pressure. According to this test standard, the neutral pressure plane is at 40" above the door sill (above this neutral plane is positive pressure). Positive pressure forces combustion gases from a room around the edge of the door. With the advent of positive pressure testing in the United States, an intumescent strip has become a useful component in fire doors in order to pass 20 minute, 45 minute, 60 minute and 90 minute rating tests. Without such an intumescent strip, the hot gases from the fire test furnace may escape through a gap between the edge of the door and its frame and char the edges of the door leading to the eventual burn-through of the wood edge.

Examples of known fire doors incorporating intumescent materials are set out below:

U.S. Pat. No. 7,669,383 (Darnell) relates to a fire door designed to slow the progress of a fire in a dwelling or commercial building. More particularly, the '383 patent relates to a fire door having one or more vertical stiles that include a layer of intumescent material.

U.S. Pat. No. 6,643,991 (Moyes) relates to a fire door having a core, stiles, and rails formed of resin bonded exfoliated vermiculite, wherein the core has a density which exceeds that of the stiles and rails. The fire door also has an intumescent material placed on some or all of the exposed edges of the stiles and rails.

U.S. Patent Publication No. 2002/0124497 (Fortin et al.) discloses a fire resistant door edge construction composed of an incombustible door stile including an intumescent seal intimately fixed in a groove in the stile, over a rigid strip of high density material located in the base of the groove for anchoring hinge screws.

U.S. Pat. No. 6,115,976 (Gomez) relates to an assembly for sealing a fire resistant door within a door frame during a fire. The fire resistant door has a plurality of edges. The assembly comprises a first body portion and a second body portion secured to the first body portion. An expansion mechanism between the first body portion and the second body portion for moving the second body portion in a direction generally away from the first body portion and against the door frame upon attaining a predetermined temperature with the first body portion, the second body portion, and the expansion means forming a door edge device wherein the door edge device is secured to at least one of the edges of the fire resistant door.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

When a door is exposed to fire, hot combustion gases can flow through gaps formed between the edges of the door and a surrounding doorframe. Exposure to these hot combustion gases can cause the edges of the door to char and/or burn faster than the core of the door. Charring and burning of the edges of the door can increase the size of the gap between the edges and the surrounding frame, which can increase the flow of combustion gases around the door. If a sufficient flow of combustion gases passes around the edges of a door, a fire may spread past the door even if the fire does not consume the core of the door. Inhibiting the flow of combustion gases around the edges of a door can inhibit the spread of fire past the fire door.

To inhibit the flow of combustion gases, intumescent materials can be incorporated into the edges of the fire door. One known intumescent material used in fire doors is expandable graphite. The expandable graphite used in existing fire doors is typically a laminate sheet material comprising graphite sheets bonded together with a heat-activated adhesive. The graphite sheets are rigid and are not extensible. When exposed to heat, the adhesive expands and the sheets of graphite are forced apart in a primary expansion direction, but there is very little, if any, expansion in any other direction. When this material is used along the edge of a fire door, the expansion of the expandable graphite can create a seal between the expandable graphite (or a cover material) and the door frame, but the uni-directional expansion of expandable graphite sheets offers little or no thermal protection to the expanded graphite and/or any other door components or cover materials attached thereto. In the absence of thermal protection, both the expandable graphite and the other door components may be charred or consumed by the fire, thereby reducing the effectiveness of the seal. Sheets of expandable graphite can also be brittle and difficult to machine or otherwise handle.

Another known intumescent material used to create a gas seal around fire doors is a sodium silicate based material, such as Palusol™ material manufactured by BASF AG Corporation. Palusol™ material tends to have a primary expansion direction (typically arranged to extend toward the door frame, in the same plane as the door face) but can also be somewhat expandable in more than one direction. Expansion can occur in a secondary direction, such expansion may lead to some of the intumescent material overlapping adjacent door components. Palusol™ tends to be prone to significant amounts of creep at standard room temperatures, which can affect the distribution of the intumescent material along the vertical edges of the fire door over time. Sodium silicate based materials can also be reactive when exposed to air under atmospheric conditions, and can degrade (i.e. have reduced expansion properties) after being exposed to air for periods of time. These known intumescent materials can also tend to be unsuited for carrying structural loads and stresses, such as those created by screws used to attach hinges to the edges of fire doors.

The intumescent strip described herein can be affixed to the edges of a fire door and is expandable in a primary direction in order to create a gas seal between a fire door and a surrounding door frame, and a secondary direction to cover, and provide some thermal protection to, adjacent portions of the fire door and/or door frame. The intumescent strip includes two strips of non-intumescent material sandwiching an intumescent layer.

The intumescent layer can be formed from a plurality of expandable, intumescent particles suspended in a thermoplastic material. The intumescent particles can be formed from any suitable intumescent material, including known materials that are only expandable in a single direction, such as expandable graphite. Orienting the individual particles of intumescent material in different orientations within the thermoplastic material enables the layer to be expandable in at least the primary and secondary directions, even if each intumescent particle is only expandable in a single direction. Encapsulating relatively small intumescent particles within a thermoplastic matrix can insulate the intumescent particles from the surrounding atmosphere, which may inhibit degradation of the intumescent material. The thermoplastic can be selected to exhibit relatively little creep at room temperature (when compared to Palusol™), which can provide an intumescent layer that is generally resistant to creep at room temperature, even if the intumescent material used to form the particles has a high creep susceptibility. The thermoplastic material is selected to have a melting temperature that is lower than an activation temperature of the intumescent particles, so the plastic can be melted without activating the expansion of the intumescent particles. This enables the mixture of intumescent particles and thermoplastic material to be extruded, and may allow the thermoplastic material to melt and flow around portions of the fire door prior to, and during the activation of the intumescent particles.

The non-intumescent strips can be connected by a plurality of fasteners that extend through the intumescent layer. The fasteners are operable to at least partially resist expansion of the intumescent strip in the secondary direction so as to limit the flow and expansion in the secondary direction (optionally a fraction of the extend of the primary expansion, for example about 10% or less). The plurality of fasteners act as a variable resistance to flow in the secondary direction. This resistance to flow in the secondary direction can vary from little resistance to complete elimination of flow in the secondary direction. The resistance to expansion in the primary direction can relax as the temperature rises slightly above the activation temperature of the intumescent agent, which may gradually allow greater expansion of the intumescent strip in the primary direction. A plurality of fasteners can be distributed across the surface of the intumescent layer. The fasteners can resist movement of material within the intumescent layer, which may reduce the creep of the intumescent layer under non-fire conditions (room temperature), and control the primary to secondary expansion ratio under fire conditions. The number, spacing and relative size of the fasteners can be selected to provided a desired combination of primary expansion resistance and secondary direction expansion. The fasteners can be formed from solidified epoxy plugs that extend through a plurality of holes provided in the intumescent layer.

Optionally, the intumescent strip can be a load-bearing portion of the fire door, and the non-intumescent strips can be formed from a material having suitable mechanical properties in order to anchor a hinge screw in the door, or support other portions of the fire door.

An intumescent strip described herein includes a first material layer and an opposing second material layer. A third material layer is provided between the first and second layers and is formed from an intumescent material that is expandable when exposed to temperatures above an expansion temperature. The third material layer includes opposing first and second surfaces bonded to the first and second layers respectively, and a plurality of apertures extending through the third material layer from the first surface to the second surface. A plurality of fasteners passing through the apertures in the third material layer and bonding the first and second material layers directly to each other.

A fire door described herein includes a fire resistant core having upper and lower edges and opposing side edges extending therebetween. Top and bottom rails cover the upper and lower edges of the core respectively and a pair of stiles cover the opposing side edges of the core. An intumescent strip is attached to at least one of the top and bottom rails and at least one of the stiles. Each intumescent strip includes a first material layer, an opposing second material layer and a third material layer provided between the first and second layers. The third material layer includes a first surface bonded to the first layer, an opposing second surface bonded to the second layer and a plurality of apertures extending through the third material layer from the first surface to the second surface. The first and second layers are bonded to each other by a plurality of fasteners extending through corresponding ones of the plurality of apertures. The third material layer is formed from an intumescent material and is expandable when exposed to temperatures above an activation temperature.

A method of producing an intumescent strip described herein includes: forming a plurality of apertures through a layer of intumescent material that is expandable when exposed to temperatures above an activation temperature; bonding at least a first non-intumescent layer and a second non-intumescent layer to opposing sides of the intumescent material; and bonding the first non-intumescent layer directly to the second non-intumescent layer using a plurality of fasteners extending through respective ones of the plurality of apertures in the intumescent material.

DRAWINGS

Reference will now be made, by way of example only, to the accompanying drawings which show at least one exemplary embodiment, and in which.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

Referring to FIGS. 1-5, an intumescent strip 100 includes first and second layers 102, 104 of non-intumescent material bonded on opposing sides of a third layer 106 formed from an intumescent material. The intumescent strip 100 is configured to be attached to an edge of a fire door and has a length 108 and a width 110 that generally correspond to the dimensions of the portion of the fire door to be covered. The intumescent strip 100 is expandable from a non-expanded configuration (FIG. 2), to an expanded configuration (FIG. 3) when the strip 100 is exposed to high temperatures. The assembled strip 100 has variable strip thickness 112, which will be described in greater detail below.

The first and second layers 102, 104 are not intumescent and are formed from a thermoset sheet material, such as a high pressure phenolic laminate. Examples of high pressure phenolic laminates include paper-melamine laminates, Arborite® and Formica®.

The thickness 136, 138 of each layer can be selected to provide a desired level of mechanical strength, for example screw holding strength, to suit the use of the intumescent strip 100. In the present example, the first and second layers 102, 104 have thicknesses 136, 138 between 0.040" and 0.048", which can provide a screw holding strength of approximately 200 lbf for each number 12 wood screw that is screwed through the intumescent strip 100. In this configuration the intumescent strip 100 can function as a load-bearing portion of a fire door, and can receive screws used to attached hinges and other hardware to the fire door without requiring additional reinforcing materials.

The third layer 106, sandwiched between the first and second layers 102, 104, is formed from an intumescent material that expands when exposed to temperatures above its activation temperature and is formed from a mixture particles of an intumescent agent and thermoplastic material. The intumescent particles can be any suitable type of intumescent material, including, for example, expandable graphite flakes or power, or alkali-silicate based flakes or powders. The activation temperature of the third layer 106 can vary based on the particular intumescent particles used. In the illustrated example, the intumescent particles are expandable graphite flakes that have an activation temperature of approximately 300-325 degrees Fahrenheit. Accordingly, the third layer 106 will expand when exposed to temperatures created by normal residential or commercial building fires, which can be approximately 600 degrees Fahrenheit. Because the intumescent particles are generally randomly positioned and oriented within the thermoplastic material, the third layer 106 can expand in multiple directions even if the intumescent particles themselves are only expandable in a single direction.

The thermoplastic material used in combination with the intumescent particles to form the third layer 106 can be any suitable thermoplastic that has a melting temperature that is lower than the activation temperature of the intumescent particles selected, including, for example, polyethylene, plasticized PVC, chlorinated polyethylene, ethylene-methyl acrylate copolymer, polypropylene-ethylene copolymers and any combination thereof. Using a thermoplastic material with a melting temperature that is lower than the activation temperature of the intumescent particles allows the thermoplastic material to be melted and processed, for example to allow the thermoplastic to be extruded, while keeping the temperature below the activation temperature to prevent triggering the expansion of the intumescent particles. For example, the melting temperature can be below 300 degrees Fahrenheit and optionally can be below 250 degrees Fahrenheit.

Figure 1:
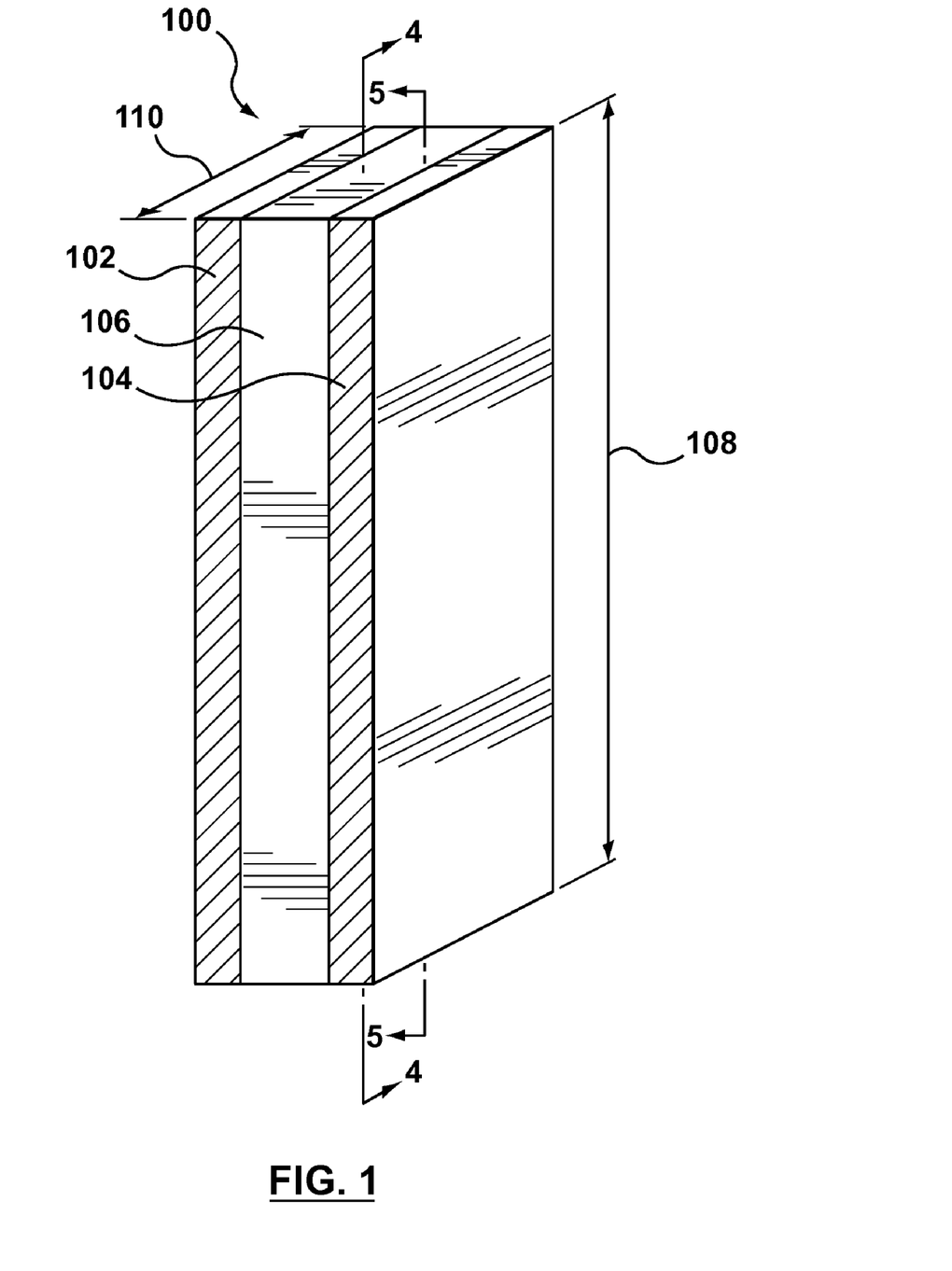
FIG. 1 is an isometric view of an example of an intumescent strip.
Figure 2:
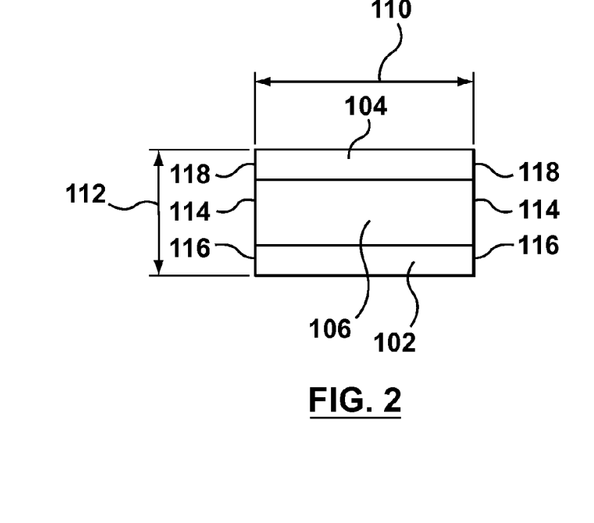
FIG. 2 is an end view of the intumescent strip of FIG. 1 in a non-expanded configuration.
Figure 3:
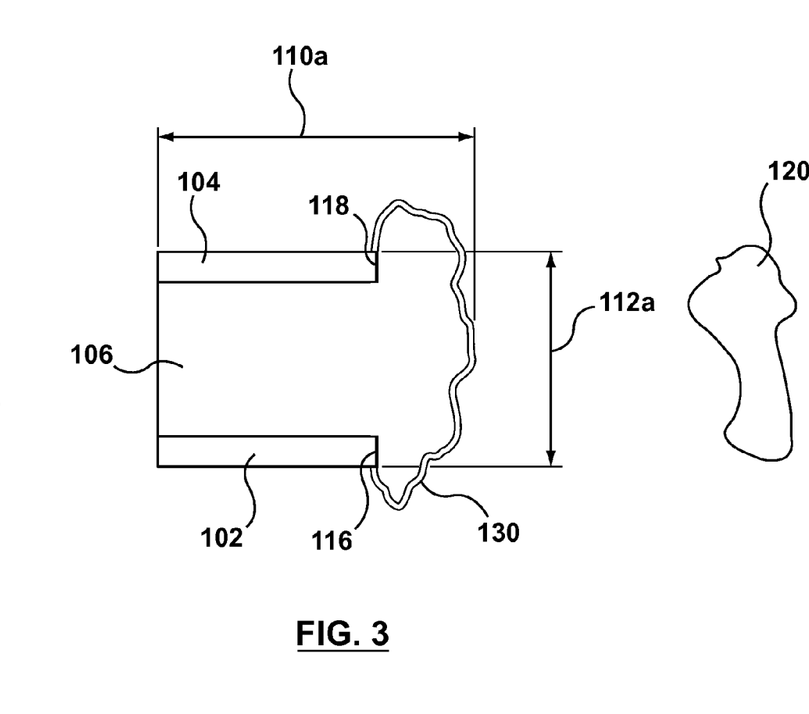
FIG. 3 is an end view of the intumescent strip of FIG. 1 in an expanded configuration.

Referring to FIGS. 2 and 3, the intumescent strip 100 is expandable from a non-expanded configuration (FIG. 2) to an expanded configuration (FIG. 3) when exposed to temperatures above the activation temperature of the intumescent particles. In the non-expanded configuration, all three layers are substantially the same width 110, and the third layer is sandwiched and contained between the first and second layers. In this configuration, the assembled intumescent strip 100 has a first strip thickness 112 that is between 0.1" and 0.25".

In the expanded configuration, the intumescent particles in the third layer 106 have expanded, thereby forcing the first and second layers 102, 104 apart and increasing the strip thickness 112 to a second strip thickness 112a, that is greater than the first strip thickness 112. In addition to forcing the first and second layers 102, 104 apart, when the thermoplastic material melts, the third layer 106 can flow beyond the side edges 116, 118 of the first and second layers 102, 104 in the width direction (secondary direction), and then swell to an expanded width 110a, so that at least some of the intumescent material forming the third layer 106 overlaps and covers the side edges 116, 118 of the first and second layers 102, 104 and also extends to cover the door edge cover strip 180, as described below. In this configuration, the intumescent material acts as an insulating layer between the side edges 116, 118 of the first and second layers 102, 104, the outer door edge cover 180 and the heat source 120. This mainly occurs on the side exposed to the heat source 120. On the unexposed side, such flow can be contained by the door veneer (skin) and also by the arrangement of the through-plugs 128 described in the following paragraphs.

The third layer 106 has a first surface 122 that is bonded to the first layer 102 and an opposing second surface 124 that is bonded to the second layer 104. In the illustrated example, the third layer 106 is bonded to the first and second layers using an epoxy adhesive. The epoxy adhesive has a relaxation temperature, above which its bonding strength decreases. In the illustrated example, the epoxy adhesive has a first bonding strength when exposed to relatively low temperatures, such as room temperature, and a second, lower bonding strength when exposed to elevated temperatures above its relaxation temperature. The epoxy adhesive in the intumescent strip 100 can be selected so that the relaxation temperature of the epoxy is approximately equal to or greater than the activation temperature such that the expansion of the intumescent particles can break the bonds between the epoxy and the first and second layers 102, 104. In such a configuration, the bonding strength of the epoxy will weaken as the intumescent strip 100 is heated which can allow expansion of the third layer 106 while providing some resistance to flow in the width or secondary direction.

Figure 4:
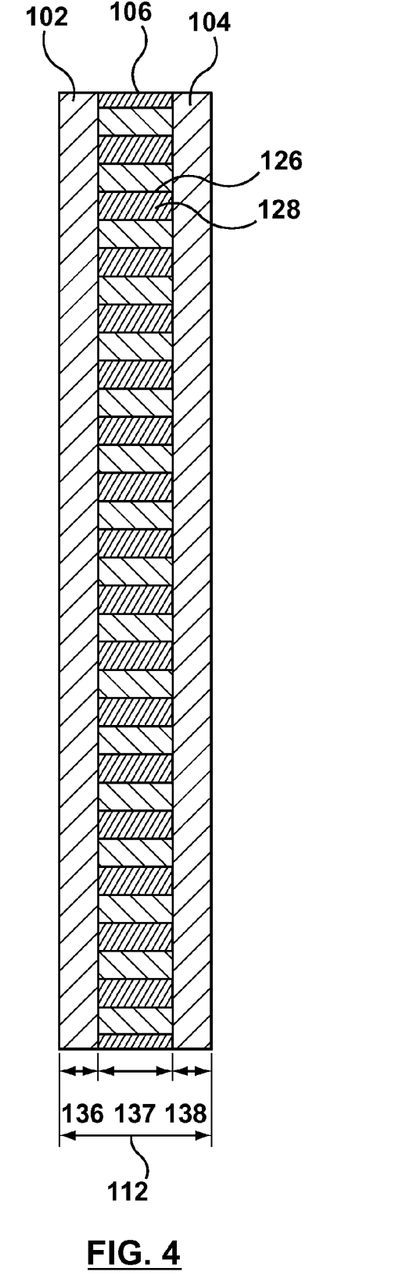
FIG. 4 is a section view taken along line 4-4 in FIG. 1.
Figure 5:
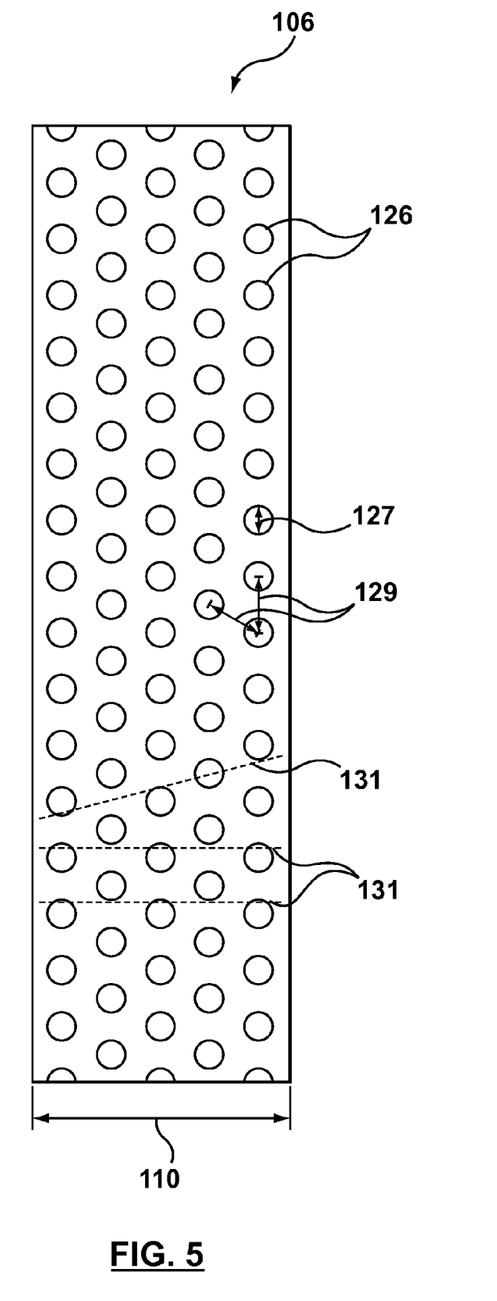
FIG. 5 is a section view taken along line 5-5 in FIG. 1.

Referring to FIGS. 4 and 5, the third layer 106 also includes a plurality of apertures 126 that are spaced apart across the third layer 106. The apertures 126 are formed as through-holes that extend from the first surface 122 to the second surface 124 of the third layer 106. In the illustrated example, the apertures 126 are filled with epoxy when the intumescent strip 100 is assembled, and the epoxy within the apertures cures to form a solidified plug of epoxy 128 that acts a fastener that extends through the third layer 106 and directly connects the first and second layers 102, 104 together.

The solidified epoxy plug 128 passing through the apertures 126 can serve to hold the first and second layers 102, 104 together and resist the expansion of the third layer 106 in the thickness direction when the intumescent strip 100 is heated. Due to the resistance of the epoxy plugs 128, as the thermoplasic material melts and the intumescent particles begin to expand, portions of the third layer 106 are squeezed out from between the first and second layers 102, 104 in the width direction.

Accordingly, expansion of the third layer 106 is at least temporarily inhibited in at least one of a first direction and a second direction by the fasteners within the plurality of apertures 126

As the temperature surrounding the intumescent strip 100 continues to increase, the bonding strength of the epoxy plugs 128 can further relax while the intumescent particles continue to expand. Over time, the expansion force of the intumescent particles can exceed the bonding strength of the epoxy fasteners 128, thereby rupturing the fasteners 128 and causing increased expansion in the primary direction. When only one side of the intumescent strip 100 is exposed to the heat source 120, the temperature of epoxy fasteners 128 can vary across the width of the strip 100. When exposed to this type of uneven heating across the width of the strip 100, not all of the epoxy fasteners 128 may break at the same time, instead the epoxy plugs 128 may fail progressively as the heat travels through the composite intumescent strip 100.

Referring to FIG. 5, the apertures 126 on the third layer 106 are generally circular and have a diameter 127 of approximately 0.2". The apertures 126 are generally equally spaced from each other and have a centre-to-centre spacing 129 of approximately 0.4" and collectively cover approximately 20% of the area of the third layer 106. The epoxy plugs 128 extending between the first and second layers 102, 104 can also serve as physical barriers to resist the flow of thermoplastic material and/or the expansion of the third layer 106 in the width and length directions. In FIG. 5, the apertures 126 are configured so that adjacent ones of the apertures 126 at least partially overlap each other in the width direction, so that each direct path between side edges 114, illustrated for example as dashed lines 131, intersects at least one aperture 126. Positioning the apertures 126 in this manner can allow a predetermined amount of flowing and expanding of the third layer 106 in the width direction before the epoxy plugs 128 breakdown and allow the strip 100 to more freely expand in the thickness direction.

Fasteners within the apertures 126 can also function as creep resistant barriers when the intumescent strip 100 is in the non-expanded configuration, which may allow for the use and containment of thermoplastic materials having relatively higher creep properties than would be desirable if the strip 100 did not include the plurality of fasteners extending through the third layer 106.

As the third layer 106 expands in the thickness direction, the epoxy plugs 128 can eventually fail and allow the composite intumescent strip 100 to expand fully. If the plugs 128 are formed from a thermoset material, the plugs 128 may fail by charring and eventually decomposing when exposed to the heat source 120. Alternatively, if the plugs 128 are formed from a thermosplastic material, the plugs may fail by melting.

Optionally, the size of the apertures 126, and the corresponding volume of solidified epoxy 128 contained therein, can be varied, for example having diameters between 0.05" to 0.5", to vary the amount of primary expansion resistance and to provide the desired flow barriers to expansion in the width direction. Optionally, the apertures 126 can be non-circular and can have any other desirable shape that allows the desired flow of material in the width direction, including, for example, oval, square, rectangular and hexagonal. The shape of the apertures 126 can also vary across the third layer 106 to provide varying flow barriers. For example, apertures 126 located toward the edges 114 could be rounder and more tightly spacer than apertures 126 located toward the centre of the third layer 106.

The number of and spacing between the apertures 126 can also be adjusted to vary resistance to expansion in the thickness direction and the flow properties of the heated third layer 106. Collectively, the apertures 126 can be sized to cover between 10%-50% of the area of the third layer 106.

Configurations of apertures 126 that block substantial portions of the side edges 114, thereby inhibiting secondary expansion, or completely surround portions of the third layer 106 may be less desirable for the fire door application but in some cases substantially complete blockage expansion in the secondary direction may be desirable.

Alternatively, instead of hardened columns of epoxy 128, the fasteners passing through the apertures to connect the first and second layers 102, 104, can be any other type of fastener that allows for the controlled resistance to expansion in the primary direction as explained above. Examples of such fasteners can include hardened columns of glue or thermoset adhesives such as polyurethane and cyanoacrylate. Optionally the fasteners used can be mechanical fasteners that are heat sensitive, so that the bonding strength of the fastener can relax when exposed to high temperatures, or fasteners that have a pre-selected yield threshold so that the fasteners can resist the initial expansion in the primary direction and then yield when the expansive force generated by the intumescent material passes the yield threshold.

Using a high pressure phenolic laminate material to form the first and second layers 102, 104 can provide desirable mechanical strength in relatively thin strips of material. Optionally, the thicknesses 136, 138 of the first and second layers 102, 104 can be varied, for example between 0.02" and 0.1", to provide a strip 100 having a different thickness 112 and different mechanical properties. Optionally, the first and second layers 102, 104 can have different thicknesses 136, 138. According, the strip thickness 112 in the non-expanded configuration can also vary and optionally can be less than 0.02" or greater than 0.1".

Optionally, the first and second material layers 102, 104 have first and second thicknesses 136, 138 respectively and the third layer 106 has a third thickness 137 that is greater than each of the first and second thicknesses 136, 138.

Alternatively, other materials, including, for example medium density or high density fiber board, thermoset plastics, metals, cement board and gypsum board can be substituted for one or both of the high pressure phenolic laminates, to achieve different strength to thickness combinations, and/or to provide other mechanical properties, such as fire resistance and compatibility with adhesives and manufacturing processes.

If the intumescent material is exposed to elevated temperatures, its outer surface may char and form an intumescent char structure or layer 130. Such an intumescent char structure 130 may have different insulating and heat transfer properties than the non-charred intumescent material and may be a better insulator (i.e. have a lower thermal transmissivity) than the non-charred intumescent material.

The intumescent material formed from the combination of thermoplastic and intumescent particles is flexible at room temperature, such that it can be bent and/or reconfigured by hand without snapping or being plastically deformed, despite the fact that the intumescent particles tend to be inflexible. The degree of flexibility of the mixture can be adjusted by varying the composition of the thermoplastic material and optionally by varying the quantity and dispersion of the intumescent particles in the mixture.

Optionally, the intumescent material can also include other materials in addition to the intumescent particles and the thermoplastic material. For example, a char former such as zinc borate (for example as sold under the brand name Firebrake® ZB) can be added and may improve the strength of the intumescent char structure and can act as a low melting point frit for the intumescent particles, for example expanded graphite particles.

If plasticized PVC or chlorinated polyethylene is used as the thermoplastic material, any suitable chlorine stabilizer, such as zinc or barium stearates, can be added and optionally, any suitable chlorine synergist, such as antimony trioxide, can be added to reduce the flame spread properties of the thermoplastic.

Any suitable lubrication agents can be added to the thermoplastic to enhance the die and mold release properties of the intumescent materials, including, for example, zinc searate or calcium searate. Optionally, any suitable fire retardant, such as alumina trihydrate, and fillers, such as calcium carbonate or clay, can also be added to the intumescent material.

Further, because the majority of the intumescent particles are completely encased within the thermoplastic material, they are not exposed to the atmosphere when the third layer 106 is installed on a fire door. Insulating the intumescent particles from exposure to air allows for the use of intumescent particles within the third layer 106 that would otherwise react with air and degrade over time.

Also, once thermoformed and cooled, the intumescent material behaves as a solid material, as opposed to a hydrated glass-like material such as solidified sodium silicate, and tends to be resistant to creep at relatively low temperatures, for example at room temperature.

Alternatively, the third layer 106 can be formed from other types of intumescent material that can expand in both the primary and secondary directions, but do not include a thermoplastic material, including solid, silicate-based materials such as Palusol®. The presence of fasteners extending through the third layer 106, and the bonding of the third layer 106 between the first and second layers 102, 104 can control the effects of creep and atmospheric reactivity associated with such known materials. Further the use of relatively high strength materials to form the first and second layers 102, 104 allows the use of intumescent materials that would otherwise be unsuitable in the load bearing edges of a fire door to form the third layer 106.

Referring to FIGS. 6-9, an example of a fire door 150 is illustrated that includes a plurality of the intumescent strips 100 described above. In this example, the fire door 150 includes a fire resistant core 152 that has a top edge 154, a bottom edge 156 and a pair of spaced apart side edges 158 extending therebetween. The fire door 150 is sized to fit within a surrounding door frame 160 and is pivotally connected to the door frame using hinges 162. The fire resistant core 152 can be any suitable core material, including, for example a particle core or a mineral core, that is capable of achieving a desired fire rating. For example, a core 152 can be selected to achieve 20, 45, 60 and/or 90 minute positive pressure ratings, according to any suitable standard, such as the UL 10-C standard. Both door faces can be covered with a wood veneer 165 or other laminate.

Figure 10:
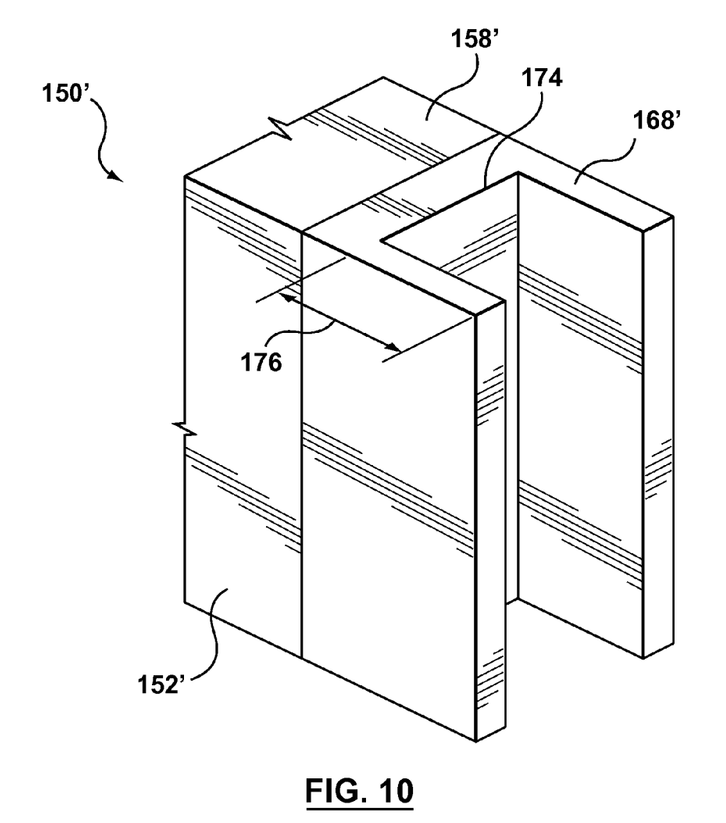
FIG. 10 is an isometric view of another example of a stile for a fire door.
Figure 11:
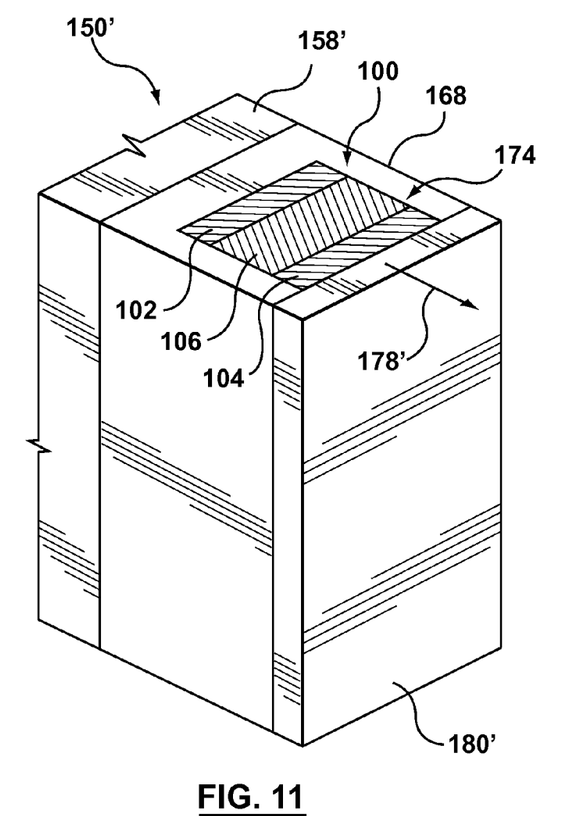
FIG. 11 is the isometric view of FIG. 10 showing the stile assembled to include an intumescent strip.

The top and bottom rails 164, 166 extend along the top and bottom edges of the fire door, and a pair of stiles 168 extend along the side edges 158, between the fire resistant core 152 and the door frame 160. The rails 164, 166 and stiles 168 can be integral with the fire resistant core 152, or provided as separate members that are fastened to the core 152, as shown in FIGS. 10 and 11.

Figure 6:
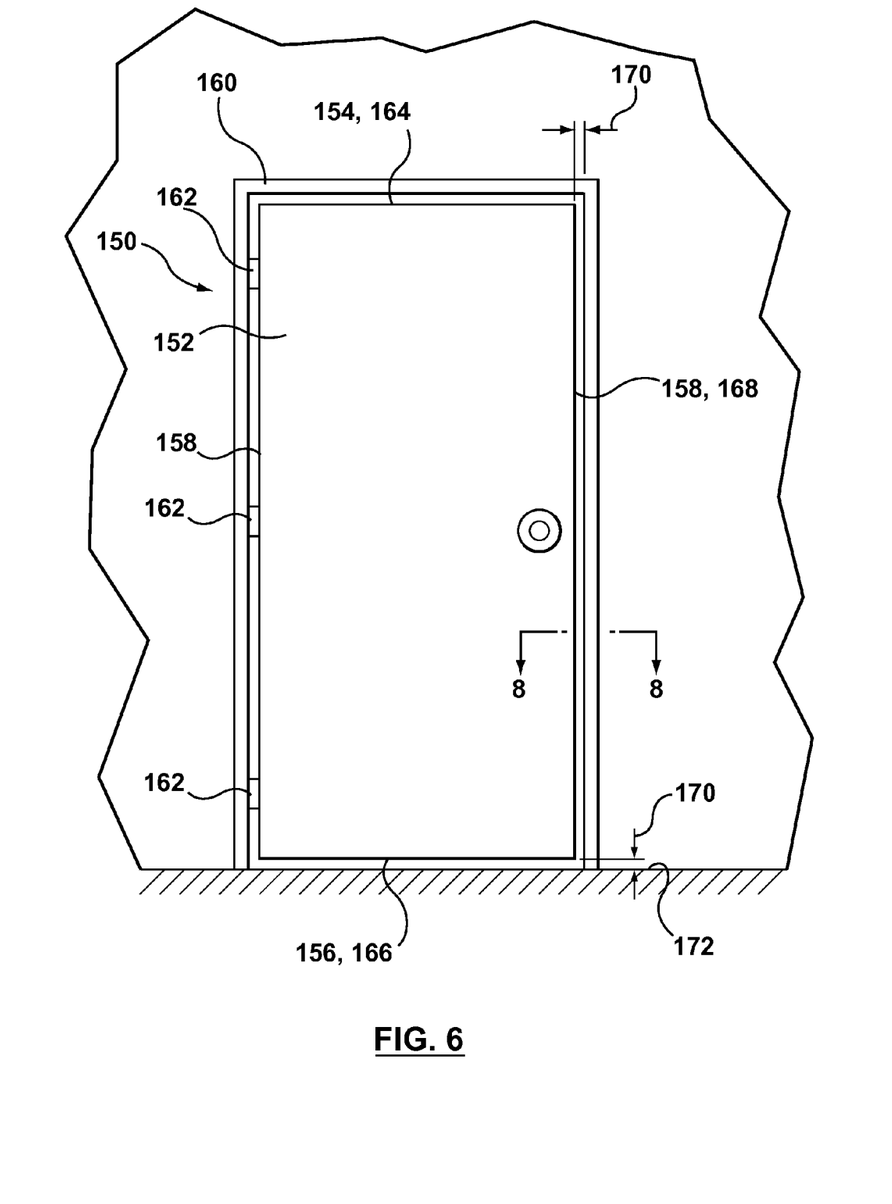
FIG. 6 is a front elevation view of an example of a fire door.
Figure 8:
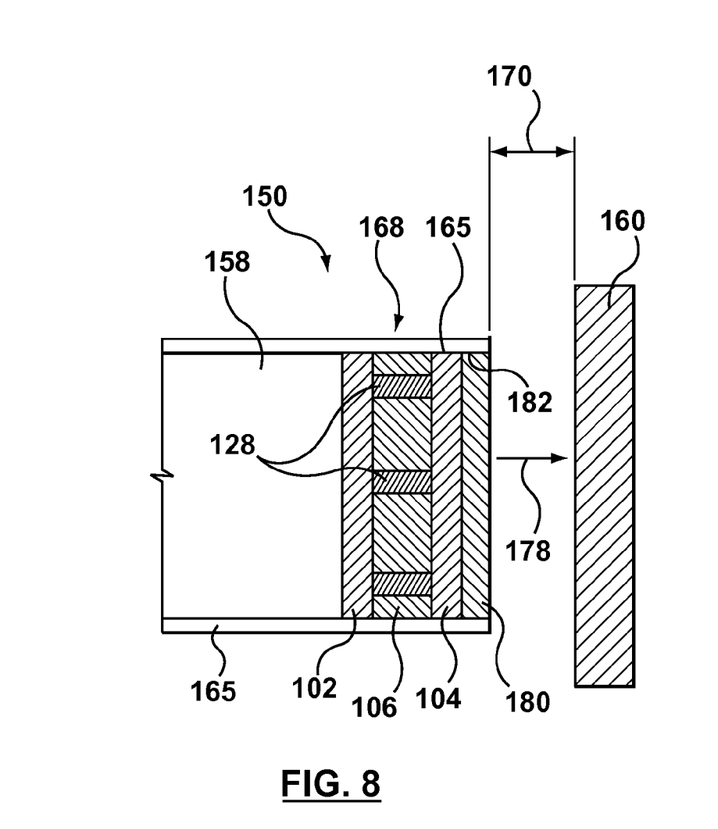
FIG. 8 is a section view of a portion of the fire door taken along line 8-8 in FIG. 6, with the intumescent strip in a non-expanded configuration.

Referring to FIGS. 6 and 8, to allow for regular operation of the fire door 150, i.e. in a non-fire situation, the fire door 150 and frame 160 are sized so that a gap 170 is created between the edges 158 of the fire door 150 and the opposing sections of the frame 160, or floor 172 in the case of the bottom rail 166.

Figure 7:
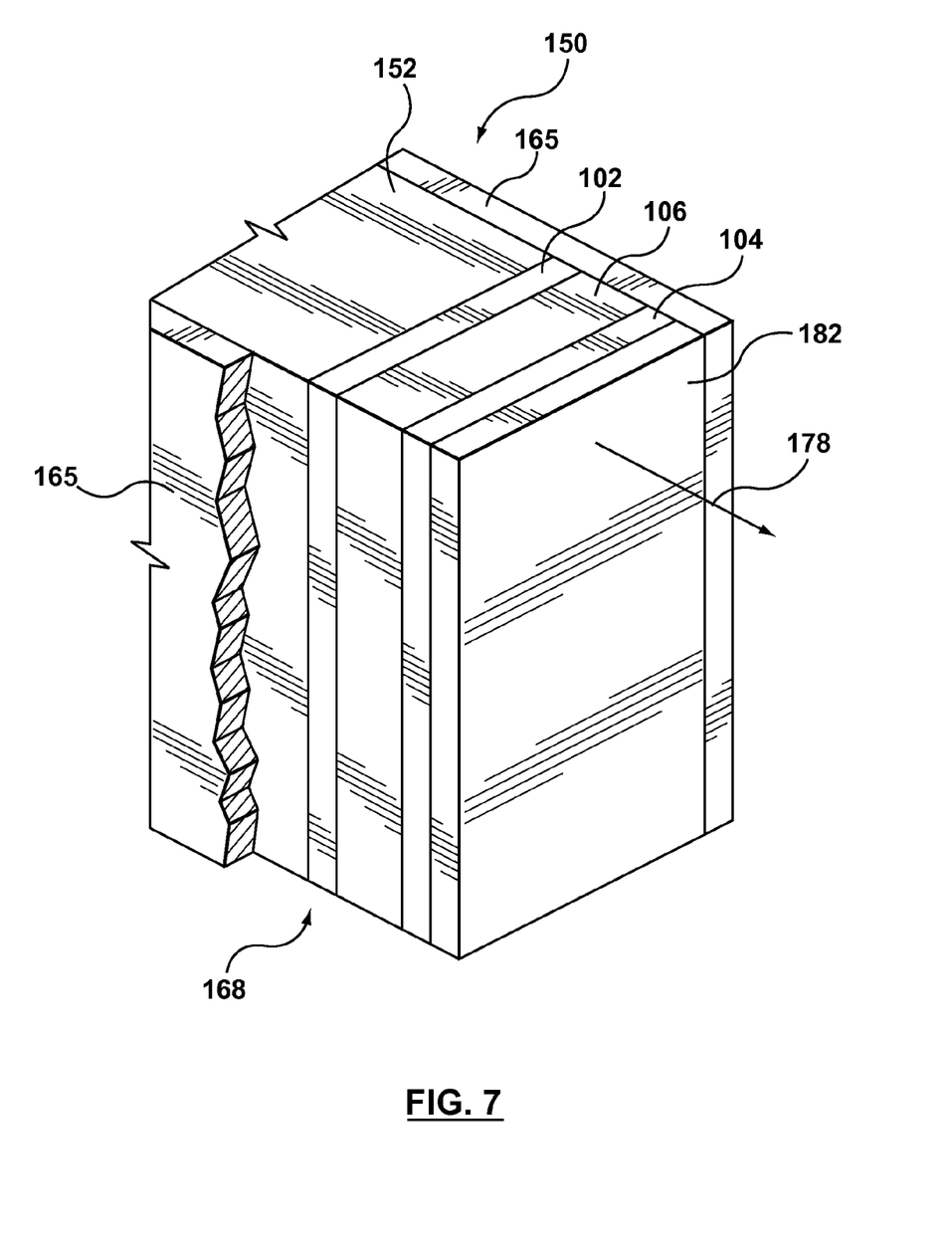
FIG. 7 is an isometric view of a portion of a stile of the fire door of FIG. 6.

One example of a portion of an assembled fire door 150 is shown in FIG. 7, with a portion of the veneer 165 cut away to reveal an assembled stile 168. The stile 168 includes the first, second and third layers 102, 104, 106 and a cover strip 180. The primary direction of expansion of the intumescent strip 100 is in the thickness direction and toward the opposing door frame 160 (FIG. 8), represented by arrow 178.

As illustrated, the intumescent strip 100 can be concealed from view by covering it with one or more cover strips 180 in combination with the veneers 165. The cover strips 180 can be formed from wood, or any other suitable material, and can provide a more visually pleasing appearance than the intumescent strip 100. Optionally, cover strips 180, may only be placed on portions of the fire door 150 that are visible to users when the door 150 is installed, for example the stiles 168, and not on portions of the door that are generally non-visible, for example the rails 164, 166. Alternatively, the fire door 150 can be used without a cover strip 180, with the intumescent strips 100 exposed and visible.

Referring to FIG. 8, when the fire door 150 is exposed to relatively low temperatures, below the activation temperature, the intumescent strip 100 is concealed by the cover strip 180 and face veneers 165. In this configuration the gap 170 between the edge of fire door and the frame, in this case between cover strip 180 and the frame 160, is maintained so that the fire door 150 can be opened and closed, and so that air can circulate through the gap 170.

Figure 9:
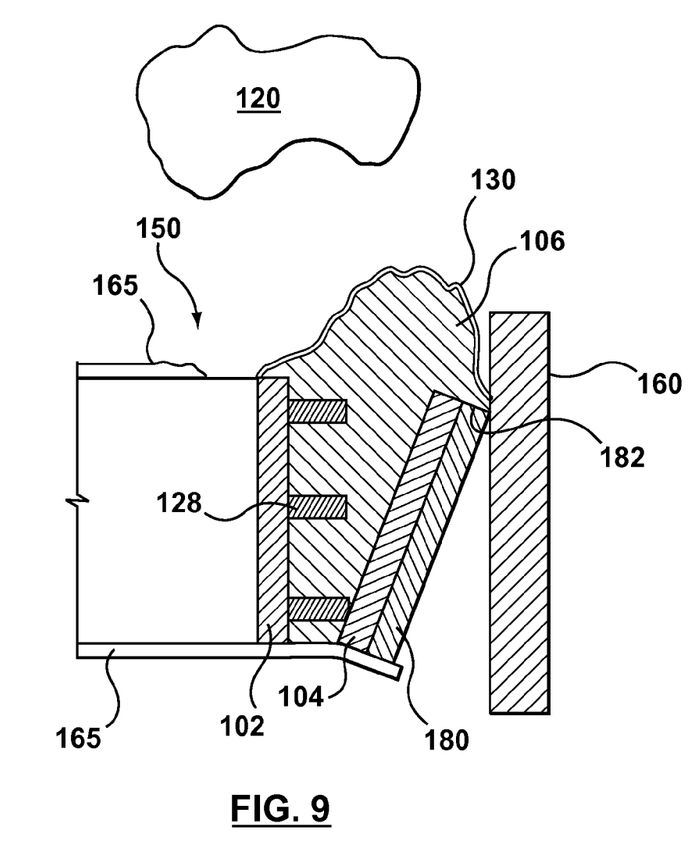
FIG. 9 is the section view of FIG. 8 with the intumescent strip in an expanded configuration.

Referring to FIG. 9, when the fire door is exposed to a heat source 120 at a temperature above the activation temperature, like a fire, the door veneer 165 on the fire side rapidly burns away, and the intumescent layer 106 expands, forcing the second layer 104 outward, away from the door edge 158 and layer 102 and toward the door frame 160. The epoxy fastening plugs 128 progressively break apart as the heat travels through the width of the intumescent material 106. The varying resistance of the epoxy plugs 128 can result in an uneven expansion of the intumescent layer 106, with portions of the intumescent layer 106 adjacent the fire expanding to a greater extent than portions of the intumescent layer 106 spaced away from the fire.

The cover strip 180, positioned on the outside of the second layer 104, is also forced away from the edge 158 of the fire door and toward the door frame 160, until the cover strip 180 abuts the door frame 160 as shown. In this configuration, at least a portion of the cover strip 180 is pressed firmly against the door frame 160, eliminating the gap 170, which effectively seals the fire door 150 to the door frame 160. In this configuration, movement of the fire door 150 is inhibited, and the seal between the cover strip 180 and the door frame 160 inhibits the flow of air and/or hot combustion gases between the edge of the fire door 150 and the frame 160.

In addition to sealing the cover strip 180 against the door frame 160, at least a portion of the intumescent material in the intumescent strip 100 can expand in the secondary direction to cover the first and second layers 102, 104 and at least a portion of the side edge 182 of the cover strip 180 on the stiles and rails. As the intumescent material swells, it acts as a thermal insulator or shield layer over the edge of the cover strip 180, which may reduce the charring and slow the breakdown of the cover strip 180. The intumescent char layer 130, as described above, can provide further protection. Inhibiting or delaying the charring and breakdown of the cover strip 180 may help preserve the integrity of the seal between the cover strip 180 and the door frame 160, and can extend the useful fire resistance life of the fire door 150.

While a single stile 168 has been illustrated in the example above, it is understood that intumescent strips 100 and cover strips 180 can be incorporated into each of the rails 164,166 and stiles 168 of the fire door 150 in the same manner.

Referring to FIGS. 10 and 11, another example of a stile 168' includes a groove 174 that is sized and shaped to receive an intumescent strip 100. This method has may increase the door strength during and after a fire but may more labour intensive to build. The groove 174 is generally C-shaped and has a depth 176 that is approximately equal to the first or unexpanded thickness of the intumescent strip 100. The intumescent strip 100 is placed within the groove 174, and optionally can be fastened to the stile using any suitable means, including an adhesive or mechanical fastener (not shown) that will not interfere with the intended expansion of the strip 100. The intumescent strip 100 is positioned within the groove 174 such that the primary direction of expansion of the intumescent strip 100, in this example in the thickness direction represented by arrow 178', lies within the plane of the fire door 150', toward the opposing door frame 160 (FIG. 8).

Figure 12:
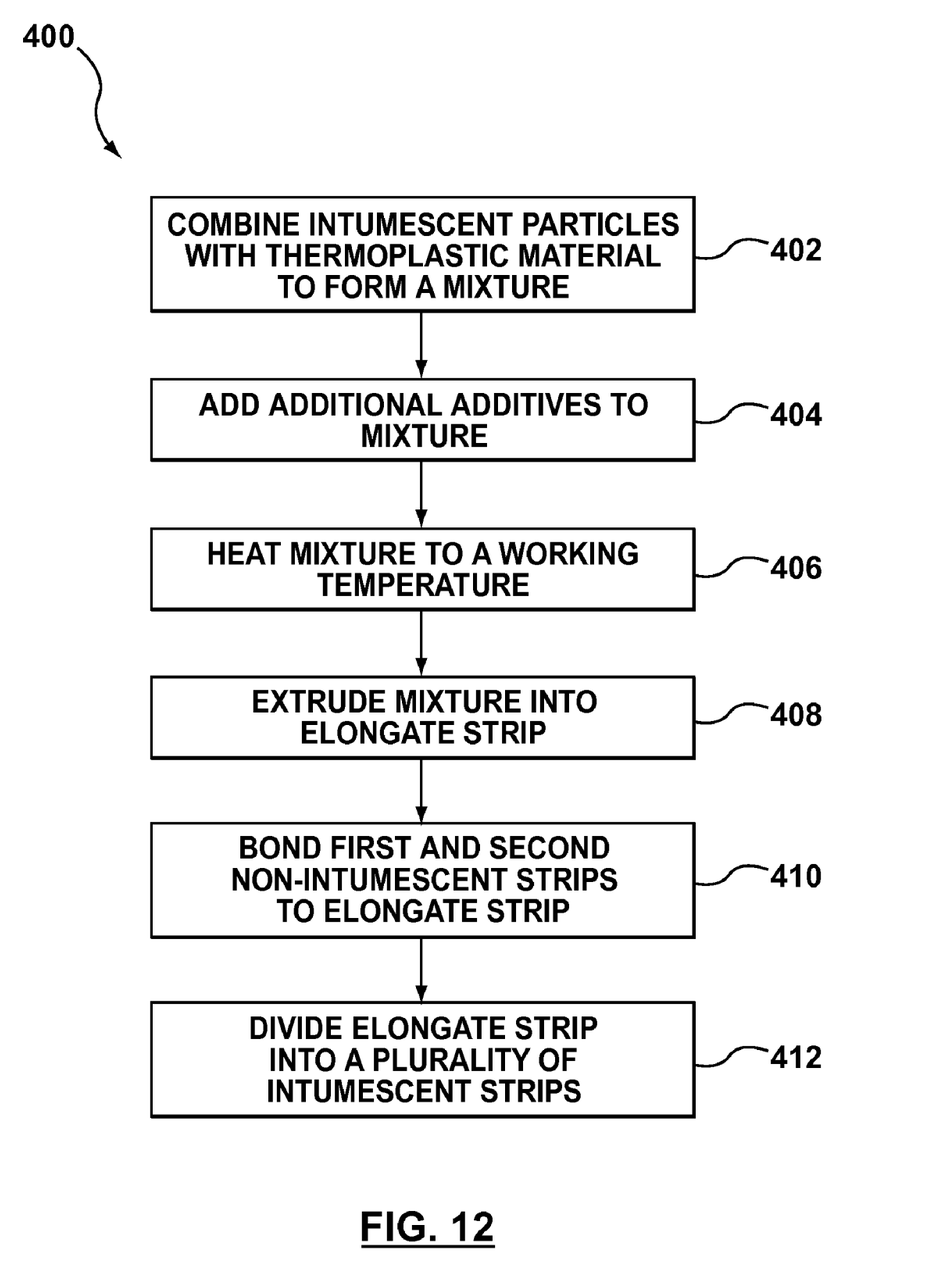
FIG. 12 is a flow chart of one example of a method of creating an intumescent strip.

Referring to FIG. 12, an example of a method 400 for producing an intumescent strip begins at step 402, in which intumescent particles (or powders as described above) are combined with thermoplastic material to form a mixture. The thermoplastic material can be provided as pellets, powder or any other suitable form that can be adequately mixed with the intumescent particles. Optionally, the mixture can be mixed so that the intumescent particles are homogeneously distributed through out the thermoplastic material. Alternatively, the distribution of intumescent particles within the thermoplastic may be non-homogeneous.

After the mixture is formed, the method 400 can proceed to optional step 404 in which any additional additives (including those described above) are introduced into the mixture to provide the desired chemical and mechanical properties in the finished material.

At step 406 the mixture is heated to a working temperature, at which the mixture can be manipulated and processed as required. The working temperature is selected to be a temperature that is above the melting point of the thermoplastic material but below the activation temperature of the intumescent particles. This allows the mixture to be melted into a flowable, liquid-like stage without triggering the expansion of the intumescent particles. While at the working temperature, the mixture can be formed into a desired shape.

Referring to step 408, the heated mixture is formed by extruding it through a die to form an intumescent layer. Alternately, injection molding, calendering or other thermoforming process can be used. At step 410, the intumescent layer, which will serve as the third layer described above, is sandwiched between and bonded to first and second layers of non-intumescent material to provide the intumescent strips 100, 200 described above.

At step 412, the composite strips, including the first and second layers and the extruded mixture, are separated into a plurality of intumescent strips 100, 200 that can be used in fire door 150, or any other suitable applications. Alternatively, the extruded elongate strip can be divided into a plurality of shorter strips prior to being bonded to the first and second layers.

What has been described above has been intended to be illustrative of the invention and non-limiting and it will be understood by persons skilled in the art that other variants and modifications may be made without departing from the scope of the invention as defined in the claims appended hereto.

The invention claimed is:

1. An intumescent strip comprising:
   a first material layer and an opposing second material layer;
   a third material layer provided between the first and second layers, the third material layer being formed from an intumescent material that is expandable when exposed to temperatures above an expansion temperature, wherein the third material layer comprises opposing first and second surfaces bonded to the first and second layers respectively, and a plurality of apertures extending through the third material layer from the first surface to the second surface;
   a plurality of fasteners passing through the apertures in the third material layer and bonding the first and second material layers directly to each other, wherein the plurality of fasteners comprises plugs of solidified adhesive passing though one or more of the plurality of apertures in the third layer.

2. The intumescent strip of claim 1, wherein the third layer is expandable in at least a primary direction and a secondary direction when exposed to temperatures above the activation temperature.

3. The intumescent strip of claim 1, wherein the fasteners have a relaxation temperature above which a bonding strength of the fasteners decreases, and the relaxation temperature is greater than the activation temperature of the intumescent material.

4. The intumescent strip of claim 1, wherein the plurality of apertures comprise at least 10% of the area of the first surface of the third material layer.

5. The intumescent strip of claim 1, wherein the intumescent material comprises a combination of intumescent particles and a thermoplastic material, wherein the intumescent particles are expandable when exposed to temperatures above the activation temperature, the thermoplastic material having a melting temperature that is lower than the activation temperature.

6. The intumescent strip of claim 1, wherein at least one of the first and second layers are formed from a high pressure phenolic laminate material.

7. A fire door comprising, in combination:
   the intumescent strip of claim 1;
   a fire resistant core comprising upper and lower edges and opposing side edges extending therebetween; and
   top and bottom rails covering the upper and lower edges of the core respectively and a pair of stiles covering the opposing side edges of the core;
   wherein at least one of the rails and at least one of the stiles comprises the intumescent strip of claim 1.

8. The fire door of claim 7, wherein the third material layer is expandable from a non-expanded configuration, in which the third material layer is positioned between the first and second material layers, and an expanded configuration, in which the third material is expanded in a primary direction to press against a door frame surrounding the fire door and in a secondary direction to cover an adjacent portion of the fire door, when exposed to temperatures above the activation temperature.

9. A method of producing an intumescent strip, the method comprising:
   a) forming a plurality of apertures through a layer of intumescent material, the intumescent material being expandable when exposed to temperatures above an activation temperature;
   b) after forming the plurality of apertures bonding at least a first non-intumescent layer and a second non-intumescent layer to opposing sides of the intumescent material; and
   c) bonding the first non-intumescent layer directly to the second non-intumescent layer using a plurality of fasteners extending through respective ones of the plurality of apertures in the intumescent material.

10. The method of claim 9, further comprising bonding the first and second non-intumescent layers to the intumescent layer using an adhesive, wherein at least a portion of the adhesive is positioned within the apertures, and further comprising forming the plurality of fasteners by curing the adhesive within the apertures to form a plurality of solidified plugs of adhesive extending through the apertures that connect the first and second non-intumescent layers to each other.

11. An intumescent strip comprising:
   a) two strips of non-intumescent material;
   b) a strip of intumescent material located between the two layers of non-intumescent material;
   the two strips of non-intumescent material being attached to each other by a fastener passing from one of strips of non-intumescent material to the other and the fastener comprises a solidified bonding agent passing through one or more openings in the intumescent strip.

12. The strip of claim 11, wherein the intumescent material is bonded to the strips of non-intumescent material.

13. The strip of claim 11, wherein the two layers of non-intumescent material comprise phenolic laminate.

14. The strip of claim 11, wherein the openings comprise a plurality of openings spaced across the width of the intumescent strip.

15. The strip of claims 11, wherein the intumescent strip comprises an intumescent agent co-extruded with a thermoplastic material.

16. The strip of claim 15, wherein the intumescent agent comprises expandable graphite flakes or powder.

17. An intumescent strip for connecting to an edge face of a fire door, the intumescent strip having the intumescent strip having a length direction and a width direction generally orthogonal to the length direction and comprising:
   a first non-intumescent material layer, a second non-intumescent material layer, and an intumescent material layer provided between the first and second non-intumescent material layers, the intumescent layer comprising a first strip edge extending in the length direction and positionable toward a first side of the fire door and a second strip edge extending in the length direction and spaced apart from the first strip edge by in the width direction;
   a plurality of apertures formed in the intumescent material layer and comprising at least a first set of apertures disposed proximate the first strip edge and a second set of apertures spaced apart from the first set of apertures in the width direction;
   a plurality of fasteners extending through the apertures in the intumescent material layer and connecting the first non-intumescent material layer to the second non-intumescent material layer; and
   wherein, when exposed to heat on the first side of the fire door that is sufficient to trigger expansion of the intumescent material layer, fasteners disposed in first set of apertures will fail while fasteners disposed in the second set of apertures remain connected until at least some of the intumescent material has expanded past the first strip edge in the width direction.

18. The intumescent strip of claim 17, wherein the plurality of apertures comprises apertures spaced apart from each other in the width direction and in the length direction and the fasteners extending through the apertures form physical barriers to inhibit creep of the intumescent material layer relative to the non-intumescent material layers.

19. The intumescent strip of claim 17, wherein the plurality of fasteners comprises plugs of solidified adhesive passing though one or more of the plurality of apertures in the intumescent material layer.

20. The intumescent strip of claim 17, wherein the intumescent material layer comprises intumescent particles suspended in a carrier material so that when exposed to the heat on the first side of the fire door that is sufficient to trigger expansion of the intumescent material particles, the intumescent material layer also expands in a thickness direction that is generally orthogonal to the width direction and the length direction.

* * * * *

UNITED STATES PATENT AND TRADEMARK OFFICE
CERTIFICATE OF CORRECTION

| | | |
|---|---|---|
| PATENT NO. | : 8,230,659 B2 | Page 1 of 1 |
| APPLICATION NO. | : 12/889867 | |
| DATED | : July 31, 2012 | |
| INVENTOR(S) | : Langille et al. | |

It is certified that error appears in the above-identified patent and that said Letters Patent is hereby corrected as shown below:

Title Page, Item (73) please delete "Lanotek Products Inc." and insert --Lancotet Products Inc.--

Signed and Sealed this
Twenty-third Day of October, 2012

David J. Kappos
*Director of the United States Patent and Trademark Office*

UNITED STATES PATENT AND TRADEMARK OFFICE
CERTIFICATE OF CORRECTION

PATENT NO.       : 8,230,659 B2
APPLICATION NO.  : 12/889867
DATED            : July 31, 2012
INVENTOR(S)      : Kevin B. Langille et al.

It is certified that error appears in the above-identified patent and that said Letters Patent is hereby corrected as shown below:

In the Claims:

Column 13, in claim 17, line 48, "a fire door, the intumescent strip having the intumescent strip having a length direction" should read --a fire door, the intumescent strip having a length direction--.

Signed and Sealed this
First Day of January, 2013

David J. Kappos
*Director of the United States Patent and Trademark Office*